Patented Apr. 1, 1930

1,752,424

UNITED STATES PATENT OFFICE

MAX ENGELMANN, OF WILMINGTON, DELAWARE, ASSIGNOR TO E. I. DU PONT DE NEMOURS & COMPANY, OF WILMINGTON, DELAWARE, A CORPORATION OF DELAWARE

SEED DISINFECTANT

No Drawing.    Application filed April 15, 1927.  Serial No. 184,187.

This invention relates to seed disinfectants and more particularly to seed disinfectants which contain wetting-out agents.

It is a common practice to add to a spray material for controlling fungicidal diseases or insect pests on small plants or the foliage of trees, a so-called "wetting-out" agent or spreader, such as soap, saponin, casein, alkyl-naphthalene alkali sulfonates, or the like, to increase the dispersing power or to reduce the surface tension of such toxic ingredients as Bordeaux mixture, arsenicals, etc.; in other words, the addition of a wetting-out material to a fungicide in water solution or water suspension assures better distribution on the foliage or plants, and therefore more efficiency.

The object of my invention is the production of seed disinfectants in which a wetting-out agent is incorporated with the disinfecting material, whereby both the disinfecting material and the seeds more rapidly become wet thus resulting in intimate contact of the disinfecting material and the seeds with each other.

I have now found that the efficiency of seed disinfectants can be greatly improved by incorporating wetting-out agents with such disinfectants as arsenicals, inorganic mercury compounds, copper compounds, organic mercurials, or the like, which are applied as disinfectants on seeds or in the soil. On account of the rough surface of certain seeds, e. g., tomato or beet seed, or a hairy surface of seeds as in the case of undelinted cotton seed, considerable difficulty is experienced in wetting these seeds during treatment. The incorporation of a small amount of a wetting-out agent, such as is disclosed above, to seed disinfectants will greatly improve the efficiency of the solution to wet the seed thoroughly, and therefore secure a better action concerning the control of the parasitic organism preying on the seed during the germination period, and subsequently on the young seedling. Now, the increased spreading effect of a disinfecting solution containing a wetting-out agent is not the only improvement, but tests on different seed have demonstrated that the quantity of solution taken up is to some extent increased in effect, which results in deeper penetration into the seed coat and more efficient action towards disease control. The beneficial effect of a wetting-out agent in a seed disinfectant is not wholly restricted to its use as a solution or a suspension. It has now been found that such materials applied as dusts on the seed and then exposed to the soil moisture spread out more uniformly, and in doing so assure better disease control.

The amount of wetting-out material that may be incorporated in a seed disinfectant to give satisfactory results can vary from a very small amount up to 10% and more, depending entirely on the efficiency of the incorporated compound. In selecting suitable wetting-out agents, materials which will react chemically with the re-agents, thus reducing the efficiency of both the disinfecting material and the wetting-out agent, must be avoided. Mixtures of two or more of these wetting-out agents may be used with satisfactory results.

In the specification and claims where I use the term "wetting-out" agent, I mean to include a substance which has the characteristics of lowering the surface tension of water.

As many apparently widely different embodiments of this invention may be made without departing from the spirit thereof, it is to be understood that I do not intend to limit myself to the specific embodiments thereof, except as indicated in the appended claims.

I claim:

1. A substantially dry seed disinfectant which comprises a mercury compound and a substance which in the presence of water will cause the disinfectant and the seed to readily become wet.

2. A substantially dry seed disinfectant which comprises an organic mercury compound and a substance which in the presence of water will cause the disinfectant and the seed to readily become wet.

3. A substantially dry seed disinfectant which comprises a mercurized aromatic compound and a substance which in the presence of water will cause the disinfectant and the seed to readily become wet.

4. A substantially dry seed disinfectant which comprises a mercurized phenolic compound and a substance which in the presence of water will cause the disinfectant and the seed to readily become wet.

5. A substantially dry seed disinfectant which comprises a mercurized chlorphenol and a substance which in the presence of water will cause the disinfectant and the seed to readily become wet.

6. A substantially dry seed disinfectant which comprises a mercury compound and a wetting-out agent.

7. A substantially dry seed disinfectant which comprises an organic mercury compound and a wetting-out agent.

8. A substantially dry seed disinfectant which comprises a mercurized aromatic compound and a wetting-out agent.

9. A substantially dry seed disinfectant which comprises a mercurized phenolic compound and a wetting-out agent.

10. A substantially dry seed disinfectant which comprises a mercurized chlorphenol and a wetting-out agent.

In testimony whereof I affix my signature.

MAX ENGELMANN.